United States Patent Office 3,512,949
Patented May 19, 1970

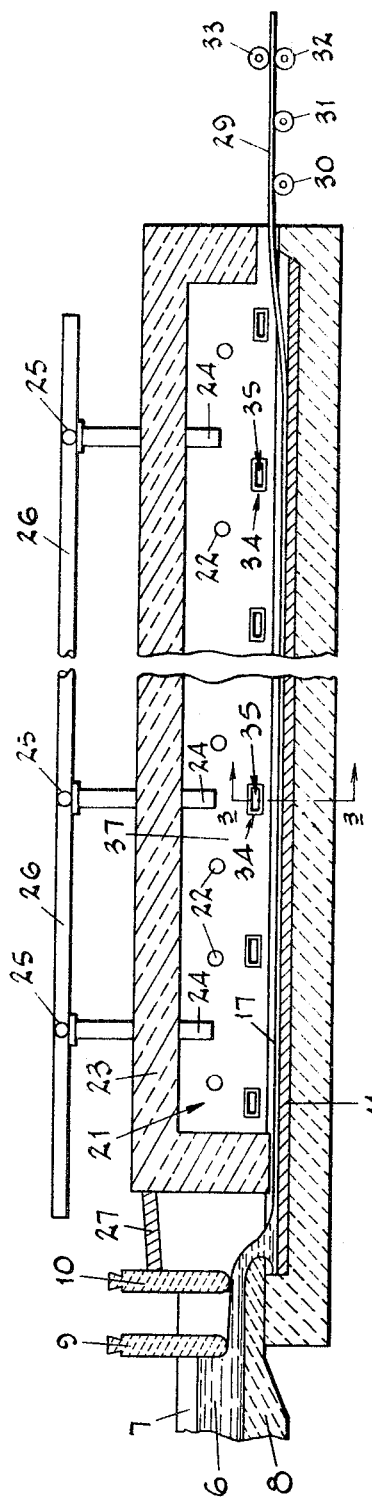
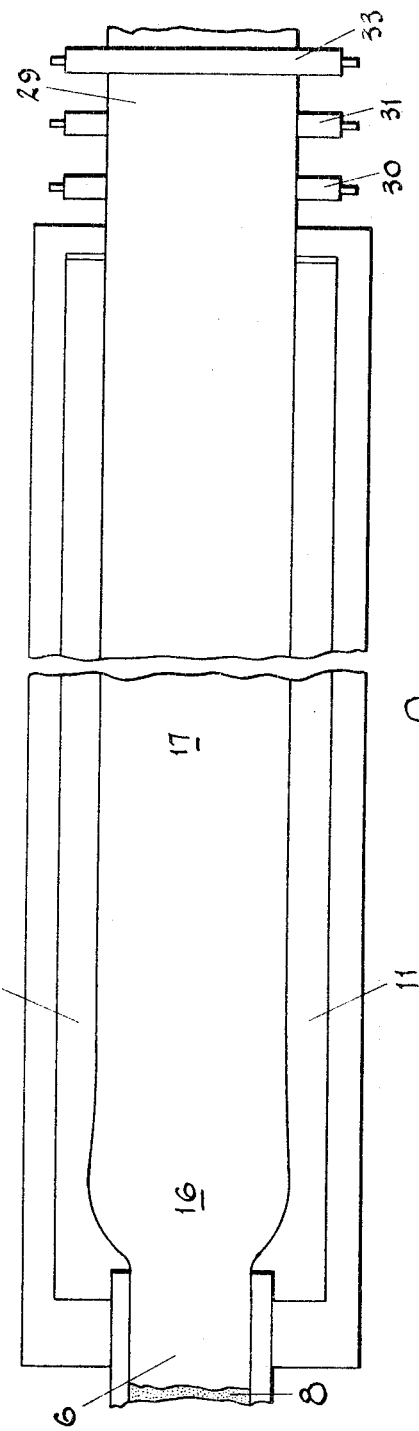
INVENTORS
*Francis L. Swillinger and
Eldwin C. Montgomery*
BY
*Nobbe & Collins*
ATTORNEYS

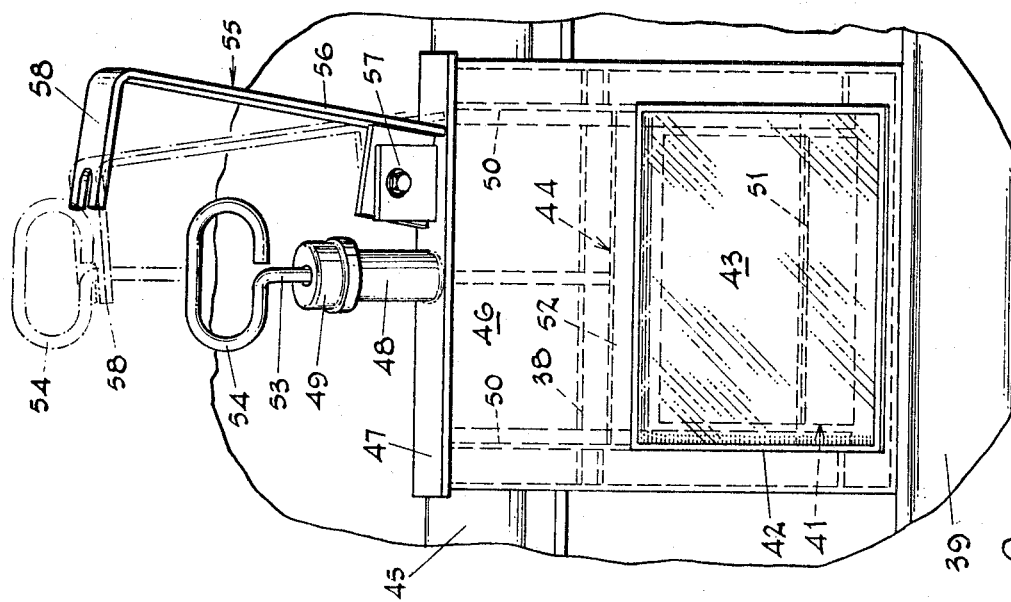
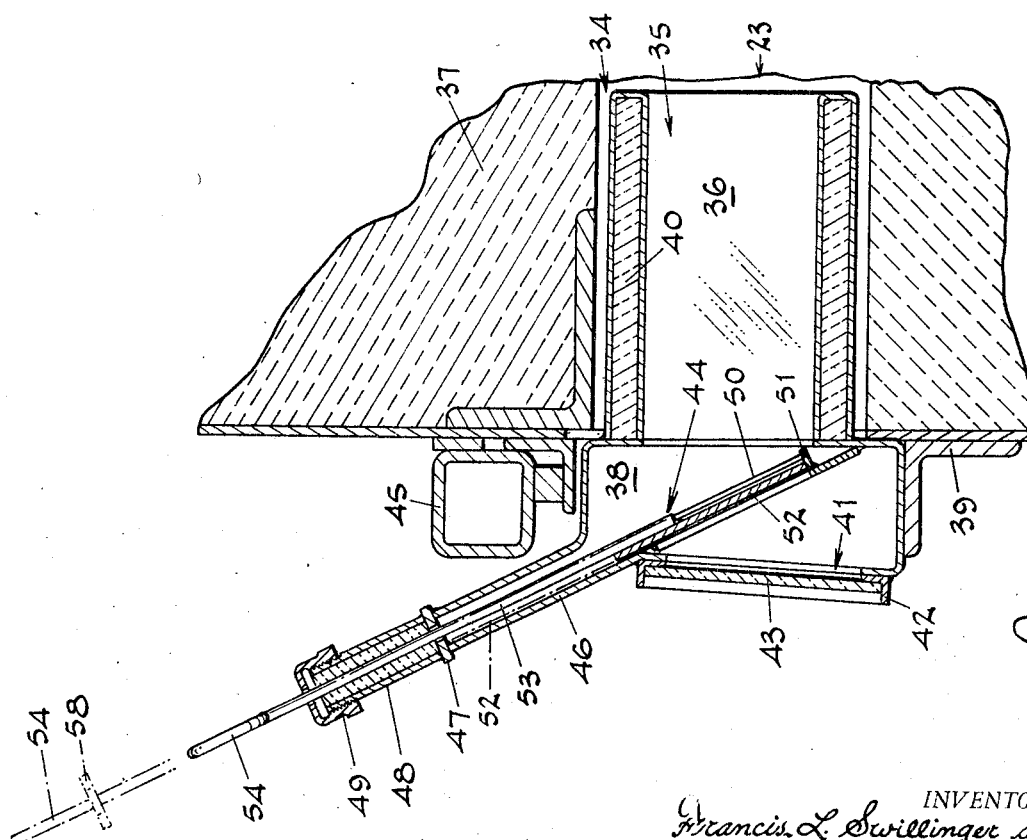

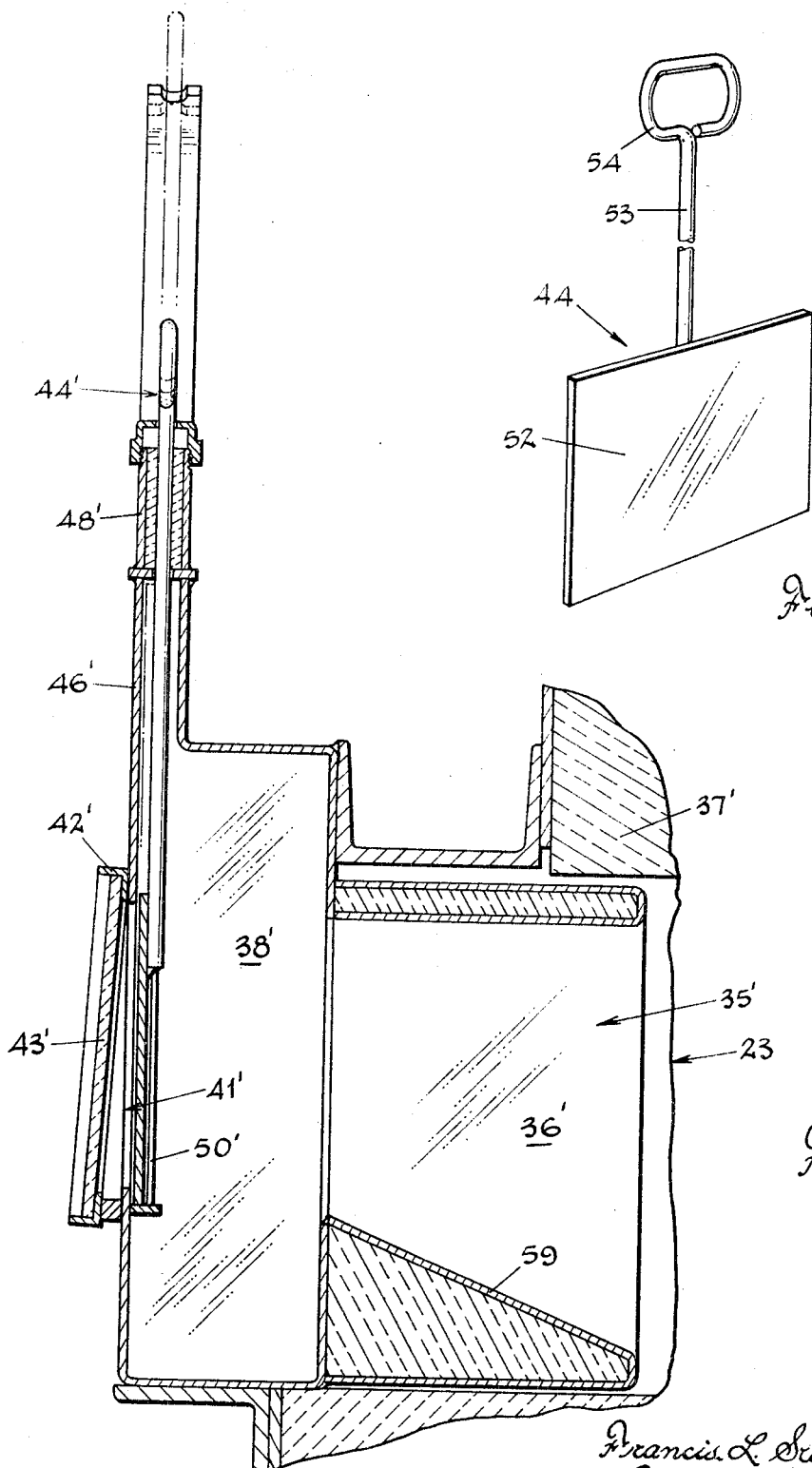

3,512,949
PROTECTIVE CLOSURE FOR WINDOWS IN A FLOAT GLASS CHAMBER
Francis L. Swillinger, Perrysburg, Ohio, and Eldwin C. Montgomery, Modesto, Calif., assignors to Libbey-Owens-Ford Glass Company, Toledo, Ohio, a corporation of Ohio
Filed Jan. 30, 1967, Ser. No. 612,678
Int. Cl. C03b 18/02
U.S. Cl. 65—159
8 Claims

ABSTRACT OF THE DISCLOSURE

An open ended box in the wall of a float glass forming machine, glazed with a pane of glass through which the glass ribbon on the float bath can be viewed and having a damper, on the bath or inboard side of the pane, that is movable into and out of shielding position relative thereto.

BACKGROUND OF THE INVENTION

Field of the invention

The present invention relates broadly to apparatus for producing float glass and more particularly to an improved form of glazed viewing box or frame for mounting in a wall thereof.

Description of the prior art

A conventional form of float glass forming apparatus is illustrated and described in U.S. Pat. No. 3,083,551, granted Apr. 2, 1963 and, as there explained, the manufacture of flat glass by the float process involves delivering glass at a controlled rate onto a bath of molten metal and advancing it along the surface of the bath under physical and thermal conditions which assure (1) that a layer of molten glass will be established on the bath, (2) that the glass in the layer can flow laterally unhindered to develop on the surface of the bath a buoyant body of molten glass of stable thickness, and (3) that the buoyant body in ribbon form will be continuously advanced along the bath and sufficiently cooled as it advances to permit it to be taken unharmed out of the bath by mechanical conveying means.

Above the float bath of molten metal a tightly enclosed head space or plenum chamber is provided to contain the so-called float atmosphere, which is usually a non-oxidizing gas or mixture of gases such as nitrogen and hydrogen under sufficient pressure to prevent contamination by leakage into the head space.

Successful operation of the float process requires careful and continuous supervision and, for this reason, viewing openings must be provided in the side walls of the plenum chamber so that operating personnel can look into the head space at various points all along the length of the machine and inspect the float bath and glass ribbon at frequent intervals. At the same time such openings must be tightly glazed, preferably with tempered or wire glass, to maintain the required seal; and this has created some serious problems.

In the first place, conventional openings glazed by normal techniques either are not or will not remain leakproof. Secondly, a glass windowpane when exposed to the fumes of the molten metal in the float bath and/or to the gas in the head space rapidly clouds up and becomes practically opaque. And, finally, workmen, in replacing obscured panes, are subjected to the hazard of severe burns from so-called "sting-out."

SUMMARY

According to this invention the above problems are minimized, if not completely overcome, by the provision of a novel form of glazed window box at each sight opening in plenum chamber walls of float glass machines, that is provided with a solid damper on the molten metal bath or inboard side of the glazing that can be readily moved from a normally closed position, in which it seals the opening and shields the glazing from the bath and the head space thereabove, to an open position where it permits unobstructed view through the glazing.

BRIEF DESCRIPTION OF THE DRAWINGS

In the drawings wherein like numerals are employed to designate like parts through the same:
FIG. 1 is a longitudinal, sectional view through a conventional float glass forming machine equipped with the window boxes of the invention;
FIG. 2 is a plan view of the apparatus of FIG. 1 with the plenum chamber removed;
FIG. 3 is a vertical, sectional view through one of the window boxes, taken substantially along the line 3—3 in FIG. 1;
FIG. 4 is a perspective view of the damper of the invention;
FIG. 5 is a fragmentary side elevation of the plenum chamber of FIG. 1 showing the window box of FIG. 3 in end elevation; and
FIG. 6 is a view similar to FIG. 3 but showing a modified form of the invention.

DESCRIPTION OF THE PREFERRED EMBODIMENTS

Referring now more particularly to the drawings there is illustrated in FIGS. 1 and 2 a typical float glass machine similar to one disclosed in U.S. Pat. 3,083,551. In this apparatus molten glass 6 is supplied from a forehearth 7 to a spout lip 8 in an amount regulated and controlled by a tweel 9 and a gate 10.

The glass flowing from the spout 8 onto the metal bath 11 forms a buoyant molten body indicated at 16 and a buoyant layer of stable thickness 17 develops therefrom.

The metal bath in the tank structure and the headspace 21 over the bath are heated by radiant heat directed downwardly from heaters 22 and this headspace 21, which contains the "float atmosphere," is enclosed by a roof structure or plenum chamber 23 which, with extension 27, makes it possible to maintain a sufficient volume of protecting gas over that part of the metal bath 11 that is exposed at each side of the glass in the float chamber. The roof structure 23 is provided at intervals with ducting 24 connected by branches 25 to headers 26 through which the protecting gas is fed into the headspace 21 at a rate to create a plenum therein. The protecting gas is one which will not chemically react with tin to produce contaminants of the glass (for example, a mixture of nitrogen and hydrogen) and, by providing a plenum ingress to the headspace 21, entrance of atmospheric air is prevented.

When the ultimate ribbon 29 is to be of substantially the same thickness as the equilibrium or stable thickness of the glass the temperature of the glass in the buoyant layer or ribbon 17 must be carefully controlled so as to progressively cool it from the tweel 19 to the discharge end of the apparatus by which time the ribbon surface should reach a temperature at which it is sufficiently stiffened to allow its transfer to a lehr on mechanical conveying means without detriment to the surfaces, e.g., about 650° C. at which the viscosity is about $10^7$ poises.

One type of mechanical conveying means that can be used includes supporting rollers 30 to 32 and superimposed roller 33 mounted outside of the discharge end of the tank. Any or all of the rollers 30 to 33 may be driven and cooperate to apply a tractive effort to the ribbon of glass moving towards the outlet end sufficient to advance it along the bath.

When a ribbon of less than equilibrium thickness is desired, this can be obtained by increasing the speed of the rolls 30 to 33 and thereby modifying their tractional effort and attenuating the molten glass body 17 of stable thickness. However, to produce at the discharge end of the apparatus an ultimate ribbon which has a width approaching the width of the buoyant body of molten glass of stable thickness but thinner than the stable body, horizontally disposed edge rolls indicated at 28 are employed to assist in holding the ribbon to width and the glass temperature must be accurately controlled to regulate the longitudinal change in its viscosity in relation to the tractive effort of the rolls 30 to 33 and so arrest further dimensional change once the ribbon has assumed the desired width and thickness.

To accomplish these things it is essential that furnace operators, edge roll operators and others be able to maintain a frequent visual check on the float bath and the glass ribbon all along their length and, according to the invention, this is provided for by the provision of a whole series of openings 34 stategically located in the walls of the plenum chamber 23 and within which are mounted special window boxes 35.

As best shown in FIG. 3, each of the boxes 35 preferably includes a rectangular portion 36 which fits within the wall or side seal 37 of the plenum chamber 23 to provide a viewing tunnel and an enlarged, generally rectangular portion 38, offset with respect to said tunnel and supported by angle iron members 39 outside the wall 37, to provide a vestibule to the viewing tunnel. The tunnel portion 36 is preferably of double walled construction to provide a closed peripheral chamber 40 which is filled with lightweight insulation.

A window opening 41 is formed in the outer wall of the vestibule 38 and surrounded with an angle iron frame 42 to permit the opening to be glazed in a conventional manner with a tempered glass plate 43 through which an operator can look into the plenum chamber 23 to inspect the molten metal bath and the glass ribbon therebelow.

As explained above, when it is attempted to provide inspection windows in the plenum chamber of a float glass machine by simply glazing a sight opening therein serious problems develop in using and maintaining them. These are (1) leakage of air and oxygen around the window and into the "float atmosphere"; (2) rapid obscuration of the glazing (under continuous action of the float bath fumes such windows become practically opaque within a few hours); and (3) danger of severe burning from sting-out when replacing an obscured window. The latter results from the presence of any inflammable gas such as hydrogen, contained as an ingredient in the float atmosphere, and which ignites as it is forced out under the pressure within the plenum chamber, during removal or insertion of the glazing, and often burns with an almost invisible flame.

It will be obvious that the window box of FIG. 3, even as thus far described, will serve to minimize the above problems. Thus, because the actual windowpane or glazing 43 is entirely outside of and spaced from the wall of the plenum chamber it will be sufficiently removed from the direct action of the heat and fumes to appreciably reduce their effect on the tightness of the seal maintained by the glazing compound and on the transparency of the windowpane. Also, the enlarged vestibule 38 will permit dissipation and dilution of fumes exiting through the tunnel 36 so as to further modify and alleviate their attack.

Even more important, however, is the provision in the window box of the invention of a damper assembly 44 which permits sealing off of all communication between the interior of the plenum chamber 23 and the windowpane 43 except for the relatively brief periods when the pane is in actual use for observation or inspection purposes.

The particular window box illustrated in FIGS. 3 and 5 is designed for use in a location where an obstruction such as the beam 45 (FIG. 3) necessitates sliding the damper at an angle to the vertical to move it into and out of operative position; and, for this purpose, the vestibule 38 is provided with an upwardly angling extension 46 closed at its upper end by an apertured plate 47 which in turn carries an upwardly extending cylindrical sleeve 48 in alignment with the aperture in the plate. The sleeve 48 is filled with lightweight insulation and closed at its upper end by a threaded apertured cap 49. Suitable damper plate slides 50 extend within the vestibule 38 and through its extension 46 and a stop or bottom support plate 51 is associated with the lower ends of the slides.

The damper itself, as best shown in FIG. 4, comprises a plate or shield 52 to which is welded a shaft 53 extending upwardly from the middle thereof and which is bent at its upper end into a substantially oval shape to provide a handle 54. In installing the damper, the plate 52 is located between the slides 50, with the shaft 53 extending through the apertures in the closure plate 47 and the cap 49, leaving the handle 54 thereabove.

It will be apparent that when the damper assembly is in the position shown in full lines in FIG. 3 the windowpane 43 will be completely cut off and shielded from the interior of the plenum chamber 23; also that by use of the handle 54 to raise the damper assembly to the broken line position, and unobstructed view through the pane 43 into the plenum chamber is obtained; but that, upon release of the handle, the damper plate 52 will immediately slide down by gravity into closed position.

To remove the necessity of retaining a hold on the handle 54 in order to maintain the damper plate in open position, a catch or the like 55 is preferably provided and, as shown in FIGS. 3 and 5, this may be a flat metal piece having a vertical portion 56, pivotally mounted at 57 on the plate 47 for movement toward and away from the capped sleeve 48, and a forked horizontal piece 58 adapted to engage and retain the handle 54 in its raised position.

Normally the damper plate 52 is retained in its closed or full time position by gravity to seal off and shield the windowpane 43 from fumes and gases entering the tunnel 36 from the interior of the plenum chamber 23 and, whenever it is desired to look into the plenum chamber in any area, the operator simply raises the handle 54 of the nearest window box 35 and engages it with the forked end of the piece 58 to obtain an unobstructed view through the window. As soon as his observation or inspection is completed he releases the catch and permits the damper to slide downwardly into its closed position.

In this way the windowpane 43 is not only relatively remote from the fumes that react to obscure its transparency, even when the window is in use, but, in addition, it is completely and effectively shielded from their action at all other times. Because of this the windowpane remains transparent for much longer periods and, if and when vision through it is finally obscured, the window box of the invention can be reglazed with the damper plate in closed position and all danger from sting-out during the reglazing is obviated.

FIG. 6 illustrates a modified form of window box designated 35' and which is designed for use where there are no obstructions to interfere with movement of the damper along a truly vertical path. Like the box of FIG. 3, it includes a tunnel-like, double walled, insulated portion 36', which fits into a wall or seal 37', and an enlarged vestibule 38' provided with a window opening 41' surrounded by a frame 42' glazed with a plate or tempered or wire glass 43'. In this form the window opening 41' is preferably in substantial alignment with the tunnel 36′, the pane 43′ is mounted at a slight angle to the vertical and the lower wall 59 of the tunnel is angled downwardly from the outside in to provide wider angle vision into the interior of the plenum chamber 23. Also, the extension 46′ to the vestibule 38′, the sleeve 48′, slides 50′ and the damper assembly 44′ are all located in practically true vertical planes.

Otherwise the construction and operation of the window box of FIG. 6 is essentially the same as that of FIG. 3 and will accomplish the desired results in a similar manner.

We claim:

1. In apparatus for producing float glass which includes a container, a bath of molten metal in said container, means for establishing a buoyant body of molten glass in ribbon form on said metal bath, means for advancing said ribbon along said bath and subjecting the same to controlled tractive force in the direction of its advance, and a walled plenum chamber enclosing an atmosphere other than the outside atmosphere under pressure and having a sight opening in a wall thereof; the improvement comprising a window box fitted to said sight opening including a tunnel-like portion extending into said wall from the outer surface thereof, a vestibule communicating with said tunnel outwardly of said wall, said vestibule including a peripheral rim surrounding the end of said tunnel and a wall at its outboard side having a viewing opening therein, a replaceable transparent pane glazing said window opening, and a damper assembly including a shield means slidably mounted within said vestibule for movement from a shielding position spaced from said pane and between said pane and the open end of said tunnel to a viewing position out of the line of sight through said pane and tunnel, and means in said vestibule within which the edges of said shield are received effecting a substantially tight fit around said shield means in said shielding position to substantially prevent contact of said atmosphere from said plenum chamber with said pane and prevent excessive escape of said atmosphere in removing and replacing said pane.

2. Apparatus as defined in claim 1 in which said shield is mounted for movement in generally vertical direction and is normally held by gravity in said shielding position.

3. Apparatus as defined in claim 2 in which said vestibule is an enlargement of said tunnel and has an extension opening upwardly therefrom.

4. Apparatus as defined in claim 3 in which said shield is located in said vestibule and operably connected to a handle outside thereof, and a catch is provided for retaining said handle when said shield is out of shielding position.

5. Apparatus as defined in claim 4 in which a sleeve filled with insulation extends upwardly from said extension on the vestibule, and said operable connection to said handle is a rod extending through the insulation in said sleeve.

6. Apparatus as defined in claim 1 in which said tunnel is of spaced double walled construction, the space between the double walls is filled with lightweight insulation, a frame is provided outside of the outboard wall of said vestibule and in surrounding relation to the window opening therein, and said windowpane is glazed in said frame.

7. Apparatus as defined in claim 1 in which said window opening is in general alignment with but offset downwardly from said tunnel, and said shield is located in said vestibule and mounted for sliding movement at an angle to the vertical into position to seal off said window opening from said tunnel.

8. Apparatus as defined in claim 1 in which said window opening is in general alignment with said tunnel, said windowpane is positioned to angle upwardly and inwardly, and the lower wall of said tunnel is angled downwardly from the outboard to the inboard end thereof.

References Cited

UNITED STATES PATENTS

| | | | |
|---|---|---|---|
| 2,006,167 | 6/1935 | Hohmann | 65—181 |
| 2,132,507 | 10/1938 | Baker | 49—171 |
| 2,624,922 | 1/1953 | Ackerman | 49—171 X |

ARTHUR D. KELLOGG, Primary Examiner

U.S. Cl. X.R.

65—181, 182; 49—171; 164—150